No. 675,826. Patented June 4, 1901.
J. F. GEISLER.
PROCESS OF FIREPROOFING AND PRESERVING WOOD.
(Application filed Feb. 12, 1900.)
(No Model.)
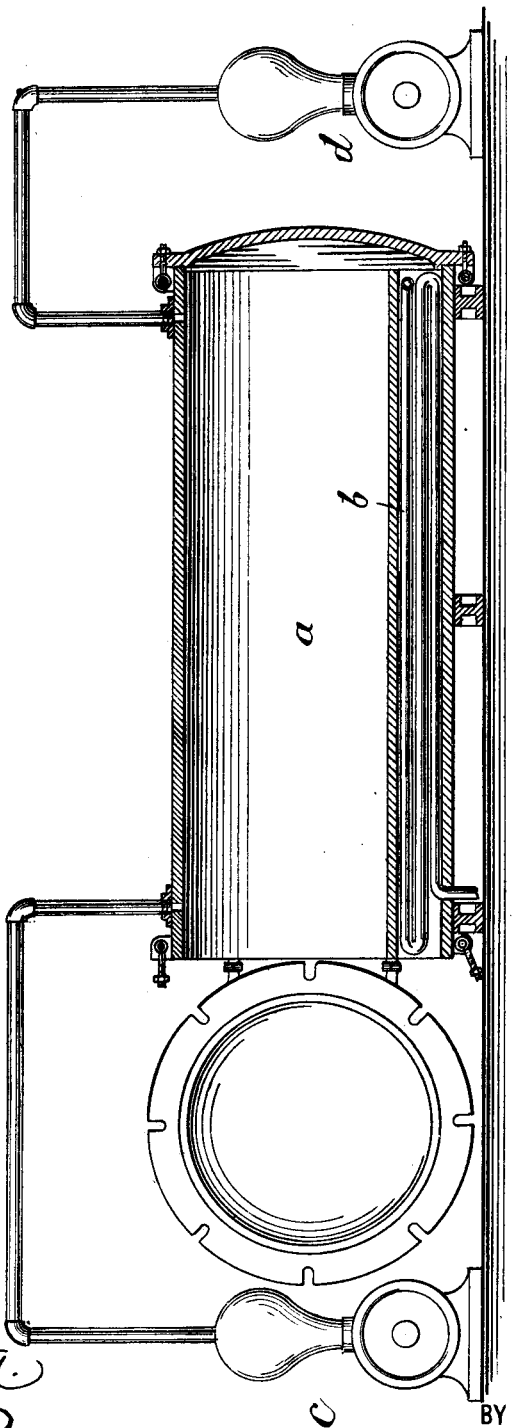
WITNESSES:
INVENTOR
BY
ATTORNEYS

UNITED STATES PATENT OFFICE.

JOSEPH F. GEISLER, OF NEW YORK, N. Y., ASSIGNOR TO THE AMERICAN WOOD FIREPROOFING COMPANY, OF SAME PLACE.

PROCESS OF FIREPROOFING AND PRESERVING WOOD.

SPECIFICATION forming part of Letters Patent No. 675,826, dated June 4, 1901.

Application filed February 12, 1900. Serial No. 5,035. (No specimens.)

*To all whom it may concern:*

Be it known that I, JOSEPH F. GEISLER, a citizen of the United States, residing at New York, in the county of New York and State of New York, have invented a certain new and useful Process for Fireproofing and Preserving Wood and other Combustible Substances; and I do hereby declare the following to be a full, clear, and exact description of the invention, such as will enable others skilled in the art to which it appertains to make and use the same.

My invention relates to a process for fireproofing and preserving wood and other combustible substances; and it consists in the novel steps of the process employed.

The objects of my invention are to decrease the cost and increase the efficiency of the treatment of wood and other combustible substances for the purpose of rendering them fireproof, to prevent deliquescence of the salts used after they have been applied, and to seal such salts into the pores of the wood in an effectual manner. These objects are attained in the process herein described, an apparatus to be used in carrying out which is shown in the drawing accompanying and forming a part of this specification.

In my process I impregnate the substance treated with an ammonia salt and with a metallic salt, which is preferably a salt containing ammonia, and then treat the same with ammonia-gas and also, if desired, with carbonic-acid gas, thereby rendering the said metallic salt insoluble in water and at the same time increasing the proportion of the gaseous fireproofing agent in the material. Preferably, also, the impregnating solution employed contains a saponifiable oil in the form of an emulsion, which will be converted by the action of the ammonia-gas and by the metallic base of the impregnating salt into an insoluble soap which seals within the pores of the substance treated the fireproofing salts deposited therein.

For the fireproofing solution I prefer to use a mixture of zinc sulfate and magnesium sulfate dissolved in a solution of ammonium sulfate, which solution may or may not contain the saponifiable oil, as preferred.

Many of the processes of fireproofing wood heretofore used are open to the objection that the fiber and the grain of the wood are affected by the steaming and chemical treatment and that the wood is disintegrated and rendered brittle. The salts deposited in the wood by many processes employing fireproofing agents of extreme solubility are liable to deliquescence. On the other hand, if salts which are soluble only with difficulty be employed it is difficult to retain sufficient of the substance in the solution to sufficiently impregnate the wood and render it non-inflammable. It is not desirable to use salts of ammonia solely, because of their extreme solubility and tendency to deliquescence; but when salts of zinc or magnesium are combined with ammonium salts new crystalline combinations are formed which are much less soluble in water than either the magnesium salts, the zinc salts, or the ammonium salts in themselves, and all these salts are capable of being enriched with ammonia by subjecting the impregnated and more or less dry wood to an ammoniacal atmosphere, which converts the metallic salts in the wood to a greater or less extent into basic salts, which are nearly insoluble in water, and finally into hydrates. If the wood be also subjected to the action of carbonic-acid gas, some of the salts formed will be converted into carbonates. Both the ammonia salts and the carbonates when heated give off their gaseous constituent, ammonia or carbonic-acid gas, which gases are extremely active in checking combustion. Sulfurous-acid gas is also given off if the heat be sufficiently intense, and this also is effective in checking combustion.

In the accompanying drawing, $a$ designates a tank in which the timber or other substance to be fireproofed may be placed for treatment. It is adapted to be closed air-tight and is provided with steam-pipes $b$, by which it may be heated. $c$ designates a vacuum-pump connected with said tank, and $d$ a pump for forcing gases or fluids under pressure into it.

I will describe my process as employed for the fireproofing of timber. The fireproofing of other substances of a combustible nature may be carried on in the same manner.

Before the treatment of the wood is begun a sample of it is tested to determine the amount of moisture the wood is capable of absorbing. For this purpose it may be placed within a suitable tank and heated therein to a temperature of from 100° to 110° Fahrenheit, a high vacuum being maintained. When the vacuum remains constant for from one and a half to three hours, the tank may be allowed to fill with water, and after the wood has absorbed nearly as much water as it is capable of absorbing without the application of pressure a pressure of from one hundred to one hundred and fifty pounds to the square inch is applied and maintained until the pressure remains constant without further operation of the pump. The wood is then removed from the tank and weighed. If the sample shows an increase in weight within ninety per cent. of what experience shows to be the maximum increase in weight which it is practicable to obtain for the particular variety of wood treated, it is deemed suitable for treatment without steaming. Otherwise it must be steamed to some extent at least. For dry pine an increase in weight of one hundred and eighty-five per cent. is sufficient. The wood to be fireproofed is then placed within the tank $a$, and if the preliminary test has shown that such wood does not require steaming it is subjected to the action of an atmosphere containing a high percentage of moisture for a period of from one to eight hours in order to soften the wood and make its cells more pliable. If steaming is necessary, the wood is subjected to it at this point. Whenever possible, it is preferable not to steam the wood, as steaming sometimes injures its quality. During the treatment of the wood with moisture or steam a vacuum may be applied to the tank intermittently, if desired. This hastens the absorption of the moisture by the wood. The contents of the tank $a$ are then heated by passing steam through the coils $b$ until a temperature of 130° to 140° Fahrenheit is attained. Such a temperature is maintained until the heat has penetrated the wood uniformly. By the operation of the vacuum-pump a high vacuum is then created in the tank, and this vacuum is maintained until it remains quite constant, after which the impregnating solution is passed into the tank $a$. This solution should be heated to a temperature just below the temperature at which it will boil under the vacuum then maintained in the tank $a$. The composition of the impregnating solution which I prefer to use is as follows: magnesium sulfate, 0.5 per cent. to two per cent.; zinc sulfate, two per cent. to seven per cent.; ammonium sulfate, ten per cent. to twenty per cent.; sodium sulfate, 0.2 per cent. to one per cent.; water, to make up one hundred per cent.; oil emulsion of a saponifiable oil, from three to six ounces to twenty-five gallons of solution. When the tank is filled with the impregnating solution, a pressure of about one hundred and fifty pounds to the square inch is applied by means of the pump $d$ and maintained until the pressure remains constant. By the combined effect of the vacuum and the pressure the impregnating solution is forced to the heart of the timber. The pressure is usually maintained for about twelve hours. The solution is then drawn off, the wood removed from the tank and transferred to a cooler, where it is maintained at a temperature of about 35° Fahrenheit until the crystallization of the salts in the wood is completed, and then the wood is transferred to drying-kilns, where it is dried. The tank is rinsed out with water after the removal of the wood, or the wood may be cooled within the tank $a$ by passing a cooling solution through the pipes $b$ and then dried in the tank by passing a current of dry warm air therethrough; but this cooling may be omitted. Preferably the wood is dried somewhat slowly. When dry, or nearly so, it is again placed in the cylinder $a$ or into a similar cylinder and subjected to a high vacuum, after which concentrated aqua-ammonia or ammonia-gas, preferably the latter, is passed into the tank. The wood is allowed to remain in the ammoniacal atmosphere for from three to twelve hours, the contents of the tank being maintained meanwhile at a temperature of from 125° to 130° Fahrenheit. The vacuum is then broken. If preferred, the vacuum may be broken and reapplied a number of times during the treatment with ammonia. The treatment with the ammonia-gas being completed, the ammonia remaining within the tank is removed, but may be recovered in any of the familiar ways. A vacuum may then be applied to the tank and then carbonic-acid gas admitted. The carbonic-acid gas enters the pores of the wood and converts a portion of the metallic salts therein into carbonates, which salts give up their carbonic acid under the action of heat, so tending to check combustion.

From the impregnating solution above mentioned the magnesium sulfate may be omitted, if desired, or its proportion decreased, in either case the proportion of the zinc sulfate being correspondingly increased. The zinc salt is preferable to the magnesium salt for use as a fireproofing agent, because the zinc compound formed in the wood has less tendency to deliquescence than the corresponding magnesium compound. The principal reason for employing the magnesium salt in the impregnating solution is that by its use a larger percentage of metallic base can be retained in solution without precipitation. The sodium sulfate may also be omitted from the impregnating solution. It is used principally to correct the astringent effect of the zinc sulfate on the wood. The oil emulsion may also be omitted; but its use is greatly to be preferred, because the insoluble soaps formed by the action of ammonia on it are very effective in sealing the fireproofing compound within the pores of the wood. This emulsion may be prepared by adding to a sufficient quantity of some saponifiable oil, such as cotton-seed oil, about ten per cent. of a ten-per-cent. aqueous solution of glue or an equivalent amount of some other gummy matter, such as dextrine. The addition of such a gluey or gummy matter is necessary in order that the emulsion may be formed. The mixture is then agitated in the familiar manner for forming emulsions.

The effect of the treatment above described is as follows: The zinc sulfate and ammonium sulfate when mixed in solution form a double compound, zinc ammonium sulfate, which is relatively only slightly soluble in cold water, but is more soluble in warm water. The magnesium sulfate and ammonium sulfate form a similar double sulfate of ammonia and magnesia, which also is only slightly soluble in cold water, but is more soluble in warm water. Because of the solubility of these sulfates in warm water it is easy to impregnate wood with them; but when the liquid which carries them into the wood has cooled or evaporated the ammonium zinc sulfate and the ammonium magnesium sulfate are deposited in the pores of the wood, together with ammonium sulfate. The cooling of the wood after treatment, as above described, insures the uniform crystallization of these salts in the pores of the wood and avoids the tendency of the salts to deposit as a surface incrustation during the subsequent drying. The subsequent treatment with ammonia-gas converts these metallic salts to a greater or less extent into basic salts, which are even less soluble than the double sulfates above mentioned. If the treatment with ammonia be prolonged, portions of these metallic salts are converted into zinc and magnesium hydrates, which under the action of carbonic-acid gas, added as above described or derived from the external air, become carbonates.

The presence of the metallic salts in the wood prevents trouble from deliquescence of the free ammonium salts present. The ammonia also acts upon the saponifiable oil left in the wood, as above described, converting such oil into insoluble zinc and magnesium soaps.

Treatment of the wood with the impregnating solution only will render the wood fireproof to an extent sufficient for many purposes, and hence the after-treatment with ammonia may be omitted; but the treatment with ammonia is desirable, because it produces compounds which are less soluble in water than the double salts.

The process as above described may also be varied by impregnating the wood with an aqueous solution of zinc sulfate or of zinc sulfate and magnesium sulfate mixed instead of with the impregnating solution above mentioned and then after the wood has been dried treating it with ammonia-gas or aqua-ammonia, as above described. This treatment forms zinc hydrate and magnesium hydrate in the wood, together with ammonium sulfate, and if the treatment be long continued ammonium zincate will be formed, and when followed by the carbonic-acid treatment more or less basic carbonates are formed from the previously-formed hydrates.

The process above described may also be varied by dissolving zinc sulfate and magnesium sulfate or zinc sulfate alone in water and adding ammonia to the solution. When the ammonia is first added, a precipitate forms, which dissolves upon the addition of further ammonia. When wood has been impregnated with this solution and the ammonia is allowed to evaporate, a substantially insoluble compound is deposited in the pores of the wood. When this process is employed, no after-treatment with ammonia-gas is required.

I do not limit myself to the use of sulfate of ammonium, but may use instead ammonium phosphate or ammonium tungstate, the zinc sulfate being dissolved in water and a solution of ammonium phosphate or ammonium tungstate added, in such case the zinc being deposited in the pores of the wood as zinc ammonium phosphate or zinc ammonium tungstate, nor do I limit myself to the use of zinc and magnesium salts. I may employ instead salts of other metallic bases—such as iron, aluminium, or calcium—which form with ammonia insoluble compounds.

Having thus completely described my invention, what I claim, and desire to secure by Letters Patent, is—

1. The herein-described process of fireproofing and preserving wood and other combustible substances, which consists in depositing in such substances a substantially insoluable sulfate of ammonium with a metal, and an ammonium salt.

2. The herein-described process of fireproofing and preserving wood and other combustible substances, which consists in applying to such substance a salt of zinc and ammonium, with an ammonium salt.

3. The herein-described process of fireproofing and preserving wood and other combustible substances, which consists in applying to such substance ammonium zinc sulfate, with ammonium sulfate.

4. The herein-described process of fireproofing and preserving wood and other combustible substances, which consists in applying to such substance a solution containing ammonium zinc sulfate, ammonium magnesium sulfate, and ammonium sulfate.

5. The herein-described process of fireproofing and preserving wood and other combustible substances, which consists in depositing in such substance an ammonium salt with a basic salt of ammonium and a metal.

6. The herein-described process of fireproofing and preserving wood and other combustible substances, which consists in depositing in such substance an ammonium salt with a basic ammonium zinc salt.

7. The herein-described process of fireproofing and preserving wood and other combustible substances, which consists in depositing in such substance ammonium sulfate with basic ammonium zinc sulfate.

8. The herein-described process of fireproofing and preserving wood and other combustible substances, which consists in applying to such substance an ammonium salt and a metallic salt and then applying ammonia to produce a less soluble compound.

9. The herein-described process of fireproofing and preserving wood and other combustible substances, which consists in applying to such substance an ammonium salt and a zinc salt and then applying ammonia to produce a less soluble zinc compound.

10. The herein-described process of fireproofing and preserving wood and other combustible substances, which consists in impregnating such substance with a solution containing a mixture of ammonium sulfate, ammonium zinc sulfate and ammonium magnesium sulfate, and then applying ammonia to the substance so impregnated to produce a basic salt.

11. The herein-described process of fireproofing and preserving wood and other combustible substances, which consists in applying to such substance an ammonium salt and a double salt of ammonium and a metal, and then applying to the substance so treated ammonia and carbonic acid, successively.

12. The herein-described method of sealing the pores of wood and other fibrous substances, which consists in applying to such substance a saponifiable oil and a fireproofing salt of a metallic base, and then applying a gaseous alkaline reagent to produce an insoluble soap.

13. The herein-described process of fireproofing and preserving wood and other combustible substances, which consists in applying to such substance an ammonium salt and a double salt of ammonium and a metal, and a saponifiable oil, and then converting such oil into an insoluble metallic soap by the action of an alkaline reagent.

14. The herein-described process of fireproofing and preserving wood and other combustible substances, which consists in applying to such substance an ammonium salt and a double salt of zinc and ammonium, and a saponifiable oil, and then applying ammonia.

15. The herein-described process of sealing the pores of wood and other combustible substances, which consists in applying to such substance a solution containing a salt of a metallic base and an emulsion of a saponifiable oil, and then applying an alkaline reagent to produce an insoluble soap.

16. The herein-described process of fireproofing and preserving wood and other combustible substances, which consists in applying to such substance a solution containing ammonium sulfate, ammonium zinc sulfate and an emulsion of a saponifiable oil, and then applying ammonia to produce a basic ammonium zinc sulfate and an insoluble zinc soap.

17. The herein-described process of fireproofing and preserving wood and other combustible substances, which consists in applying to such substance a solution containing ammonium zinc sulfate, ammonium magnesium sulfate, ammonium and sodium sulfate, and a saponifiable oil, and then applying ammonia.

In testimony whereof I affix my signature in the presence of two witnesses.

JOSEPH F. GEISLER.

Witnesses:
 H. M. MARBLE,
 A. H. PERLES.